June 16, 1959 W. D. MacLEAN 2,890,991

ELECTRICAL PLATING TANK CONNECTOR

Filed Oct. 24, 1955 2 Sheets-Sheet 1

INVENTOR.
William Donald MacLean
BY
Eberhard E. Wattley
Atty.

June 16, 1959 W. D. MacLEAN 2,890,991

ELECTRICAL PLATING TANK CONNECTOR

Filed Oct. 24, 1955 2 Sheets-Sheet 2

INVENTOR.
William Donald MacLean
BY
Eberhard E. Wolley
Att'y.

United States Patent Office 2,890,991

Patented June 16, 1959

2,890,991

ELECTRICAL PLATING TANK CONNECTOR

William Donald MacLean, Oakville, Ontario, Canada, assignor to Florida Canada Corporation, a corporation of Delaware Application October 24, 1955, Serial No. 542,407

1 Claim. (Cl. 204—297)

This invention concerns plating tank connectors for providing curent flow between the tank work pieces and an exterior terminal on the tank from which the current is transmitted to or from an external source or location through cable or bus bar connections. This invention comprises a continuation-in-part application of my copending application Serial No. 454,411, filed September 7, 1954, and relating to Electroplating Apparatus, now abandoned.

More specifically the invention has as an object and is directed to readily separable electrical connector means having a fixed contact on the plating tank and a coacting movable contact connected with a work supporting plating rack so that the rack can be bodily withdrawn from the tank or bought into the tank thus carrying the movable contact directly with it; while automatic current break or curent make results at a predetermined instant to cut off or begin the plating cycle, respectively, either before the work pieces on the rack leave the electrolytic plating solution in the tank or after such work pieces are all completely submerged within the tank solution.

Another of the objects of the present invention is to provide a low cost practical and efficient separable contact mechanism to estabish or break curent flow to or from a plating rack and an external current source for carrying out the proper plating cycle and to provide such a mechanism to function as an automatic means acting concurrently with the withdrawal or replacement of the rack and work pieces as considered in relation to a tank during the plating operation.

Another object of the contact mechanism of the invention is to construct and arrange the coacting contact members to function as orientation or positioning means to hold the rack and its assembled work pieces in a given relation to the plating tank walls and bottom.

As a further object the invention provides a copper cup arrangement as one contact and a copper stem or pole unit to enter the cup as another contact, with the cup carrying a solution of concentrated sulphuric acid ($H_2SO_4$) to provide a current conducting medium to greatly enhance the curent flow between the separable contacts, i.e., the cup and the pole.

Another object of the invention is to provide the sulphuric acid in the cup for electric arc dampening purposes as the two copper contacts are bodily physically separated during rack withdrawal, the movable copper contact then separating out of the sulphuric acid surface during current break.

It should be noted that any acid carry over on the pole contacts that may drop into the tank solution will not affect the latter since the tank solutions normally include the same or similar acid radicals to carry out the plating process.

As another object of the invention the contact assembly is provided with a guard means to function as a cover for the cup contact to prevent accidental acid spraying or throwing particularly during the separation of the cup and pole contacts during the arcing interval and under other conditions of operation.

Some further objects and features of the invention are directed to the formation and shapes of the separable cup and pole contacts to obtain good electrical and physical union between these respective members to be able to establish a dependable current flow for good plating control by good conductivity. Also, good surface contact is enhanced between said separable members by the weight of the rack and work pieces acting on one member to press it against the other member.

And still other objects and advantages of the device of this invention shall hereinafter appear in the following detailed description having reference to the accompanying drawings forming a part of this specification.

Figure 1:
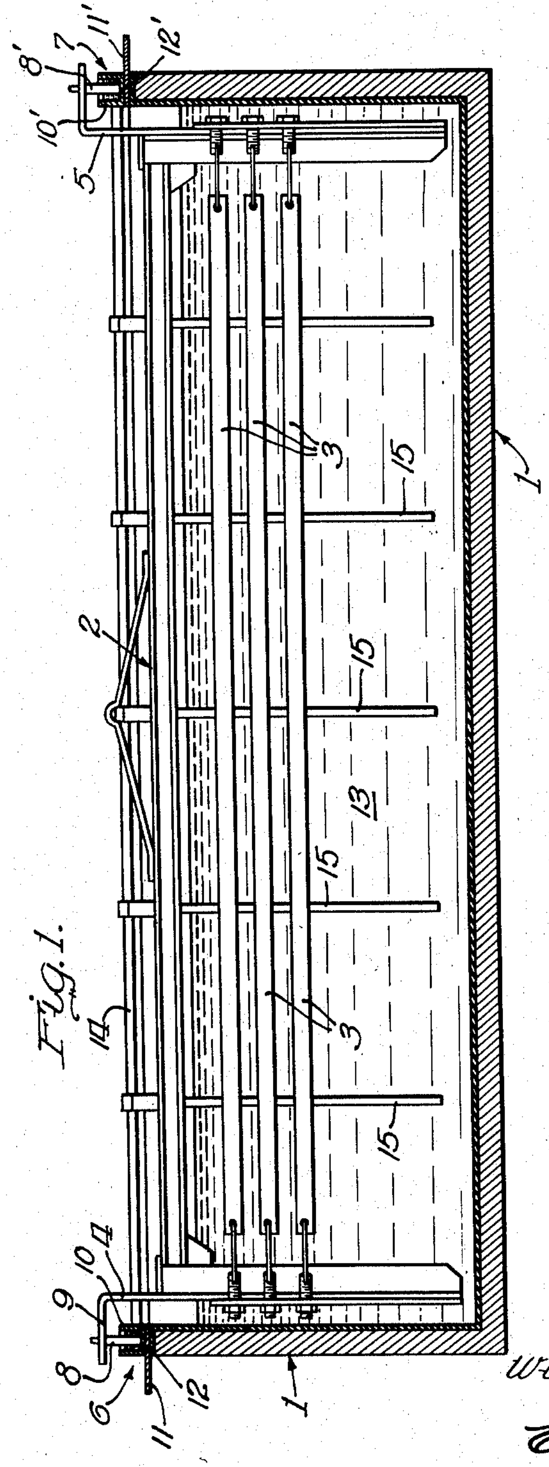
Figure 1 is a vertical cross sectional view of an electroplating tank taken substantially along a longitudinal median plane of the tank and illustrating an embodiment of the present invention.
Figures 2, 3:
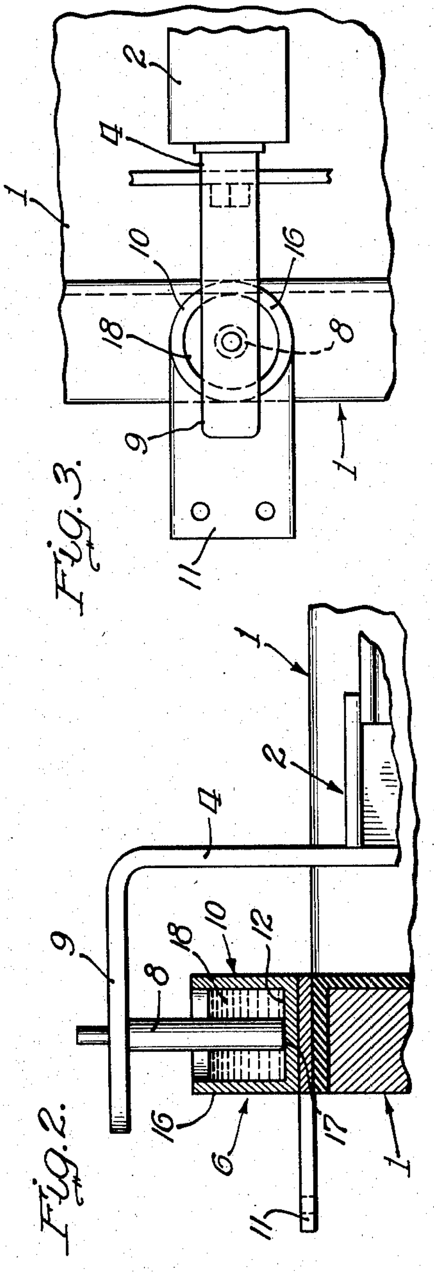
Figure 2 is a fragmentary enlarged cross sectional view of the electrical plating tank connector constructed according to the principles of the disclosed invention.
Figure 3 is a plan view of the electrical plating tank connector shown in Figure 2.

In the form of the invention shown in Figures 1, 2 and 3, a plating tank 1 is adapted for accommodating a rack 2 carrying a number of elongated work pieces 3 and each end of rack 2 is provided with hangers 4 and 5, respectively, that each connect with an externally arranged circuit by means of the current connectors 6 and 7 of the present invention. Each of the connectors are identical in design and construction and the description will be directed to the left hand unit 6 in Figure 1 with unit 7 having similar parts thereof identified by primed reference numbers.

Connector 6 shown in Figures 2 and 3 comprises a rod terminal 8 secured to an overhang 9 on the rack hanger 4 to place the rod 8 in outboard relation to the rack structure. A cup terminal 10 is mounted on tank 1 and is connected with a plate or bus bar 11 adapted for connection with one side of a circuit through any externally provided bus bar or electrical cable not shown in the illustrations. As seen in Figure 1, the rack 2 is pendulum suspended by the hangers 4 and 5 with the rod terminals 8 and 8' resting upon the flat bottoms 12 and 12' of the cup terminals 10 and 10'. Rack 2 may be used end for end if operations require such reversibility.

The other side of the circuit for the electrolyte 13 in tank 1 is supplied through one or more overhead rods such as 14 having anodes 15 suspended therefrom into the tank solution. The construction of tank 1, rack 2 and the other associated mechanisms are more specifically disclosed and described in detail in my copending application Serial No. 542,408, filed of even date herewith, and relating to Electroplating Apparatus.

Referring again to Figures 2 and 3, the cup terminal 10 has an upstanding wall 16 arranged to encircle the contact area of the flat cup bottom 12 that is provided to receive the flat squared off tip end 17 on rod terminal contact 8. Thus the outer squared off end 17 of the rod terminal 8 and the inner flat surface 12 of the cup terminal 10 are both disposed in coplanar coincident contacting relation with each other for adequate current conduction when a rack 2 is suspended in operative plating relation within the tank 1. The aggregate weight of the rack and contents enhance the current conductive union between members 8 and 10.

The upstanding circular cup wall 16 provides a guide for the circular rod 8 and clearances between the external surface of rod terminal 8 and the internal periphery of cup terminal 10 are such as to prevent tank contact or engagement of the rack structure with any portion of the interior tank walls.

The connector contacts comprising the rod terminal 8 and the cup terminal 10 are made of copper material and, as best illustrated in Figure 2, the cup terminal carries a predetermined quantity of concentrated sulphuric acid ($H_2SO_4$) 18. This acid provides a medium or vehicle for promoting additional current conducting efficiency between the terminals 8 and 10, and the contact zone between the terminals is fully submerged within the acid. Also, the fluid sulphuric acid ($H_2SO_4$) acts as an arc dampener or eliminator when the rod terminal 8 is withdrawn from physical contact with the cup terminal 10, when the rack is taken out of the tank. Current interruption is established at the instant rod 8 leaves the fluid $H_2SO_4$.

In handling the rack, current flow contact is made to the rack as soon as rod terminal 8 touches the surface of the acid and this contact occurs at a time when all the work pieces 3 are in the tank electrolytic solution. Current flow is again broken as soon as rod terminal 8 leaves the acid 18 which is at a time before the work pieces are lifted out of the tank solution. And as stated before, any arcing that does result takes place at the acid surface level and due to this arrangement the coactive contacting surfaces 17 of the rods 8 and 12 of the cup 10 are maintained in good condition for clean abutting surface engagement beneath the acid level in the cup and at the cup bottom.

Figures 4, 5:
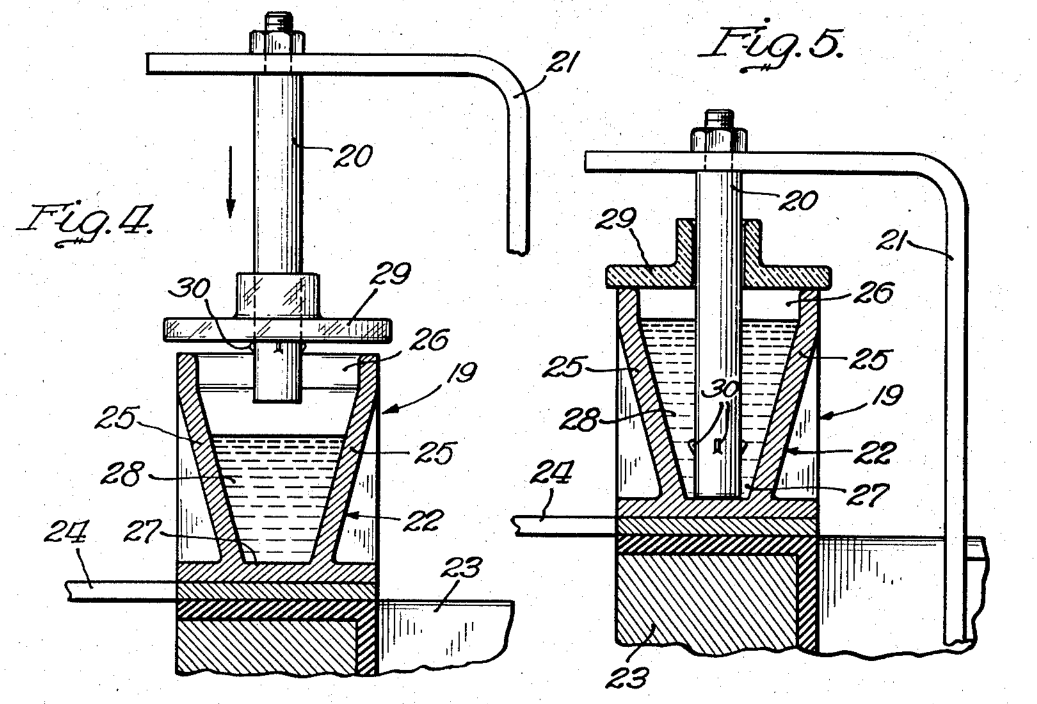
Figure 4 is a modified form of the invention illustrated similarly to the device of Figure 2 and as viewed along a vertical sectional plane.
Figure 5 is another view of the modified form shown in Figure 4 but with some of the related parts shown in other cooperative positions.

The modified construction of connector unit 19 illustrated in Figures 4 and 5 provides a rod terminal 20 on a rack hanger 21, and a cup terminal 22 carried upon a plating tank 23 and connected with a tank supported plate or bus bar 24. The cup terminal in this form of the invention has tapered walls 25 leading from a wide open mouth 26 at the top to a restricted area base 27 to guide the rod terminal 20 toward the narrow mechanical contacting area in the cup bottom.

Cup 22 carries an electrical current conducting fluid 28 and rod terminal 20 supports a cover 29 for sliding movement therealong with suitable detents 30 being provided on rod 20 to limit the downward motion of cover 29 and to prevent accidental displacement thereof. Cover 29 may be made of glass or other electrical insulating material to prevent premature current flow between the terminals and to confine the electrical make and break period to the instant the end of the rod terminal 20 touches or leaves the fluid surface in cup 22. The changed positions of the parts in Figures 4 and 5 illustrate the operation of this connector and the cover feature. With this arrangement all fluid activity such as spraying or agitation is confined to the cup through the instrumentality of the cover 29.

Figure 6:
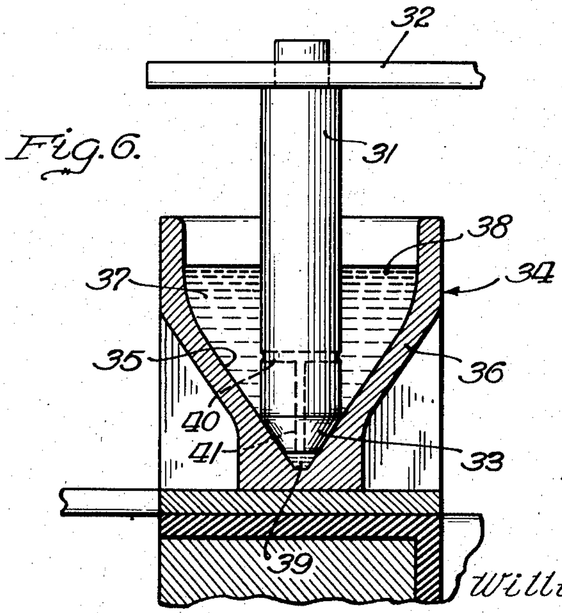
Figure 6 is still another modified construction of the device of this invention also generally illustrated in a vertical sectional plane.

Figure 6 shows another rod terminal 31 on a hanger 32 having a conical tip 33 used in conjunction with a cup terminal 34 having a matching conical interior 35 in the walled section 36 thereof. The angularity of the conical tip and walls is such as to provide an intimate wedge action seating contact between the terminals. In this construction, a fluid 37 having good current conducting qualities is carried in the cup and since the abutting union of the conical tip and cup surface area portion divides the fluid into separate bodies 38 and 39, the tip 33 of rod 31 includes connected bypass passageways 40 and 41 to permit communication between the two fluid bodies and to insure firm mechanical engagement between the two relatively movable terminal members and for good electrical operation as in the constructions shown in Figures 2 and 4. Tip 33 lends itself admirably to turning or dressing down if a new contacting surface area should be required.

Figure 7:
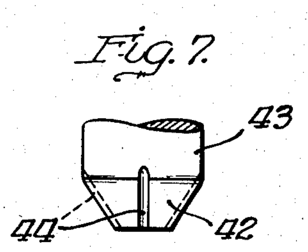
Figures 7 and 8 are detailed views of some variations in the parts shown in the Figure 6 modified construction.
Figure 8:
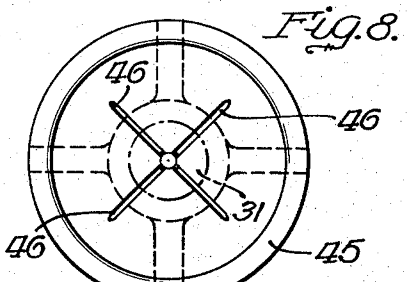

In Figure 7, a modified tip 42 similar to tip 33 in Figure 6 is shown on a rod terminal 43 and this tip is provided with surface grooves 44 for fluid bypass purposes. In Figure 8, the terminal cup 45 is the same as cup 34 in Figure 6, but in this instance internal radially formed surface grooves 46 are provided in the cup surface to establish fluid bypass means in the cup instead of in the rod as in Figure 7.

The foregoing complete description has been directed to several preferred forms of the connector of the present invention. Certain changes are deemed possible in the individual elements and/or in the combination of such elements without departing from the fundamental concept of the invention. Such modifications shall, however, be governed by the breadth and scope of the language in the appended claimed subject matter as directed to the features of the present invention.

What I claim is:

A connector for a plating tank comprising, in combination, a tank wall, a work piece rack, and an electrical current conducting cup mounted upon said tank wall, an electrical current conducting solution within said cup, said cup having downwardly and inwardly sloping walls terminating about a limited flat supporting area at the bottom of said cup, and a bracket on said rack comprising an upright leg and a horizontal ledge on said leg extending outwardly from one end of said rack, and a current conducting rod depending from said ledge in spaced relation to said leg and extending downwardly into said cup for bodily support by said cup per se, the end of said rod having a flat face thereon to seat upon the flat supporting area at the bottom of the cup and being guided thereto by the sloping walls of said cup, and said rod and cup bottom being proportioned for minimum play between the outer peripheral portion of said rod and the adjacent surrounding terminal ends of said cup walls to preposition said rack within the plating tank and to prevent accidental displacement of the rack and its work pieces under operative conditions, said rod having a length exceeding the depth of said cup and a cross-sectional area substantially smaller than that of the open end of said cup, and insulating closure means to cover said solution cup during operative procedure comprising a cover slidably carried upon said rod and providing means to rest upon the cup when said rod is seated upon the cup bottom, said rod having projections thereon to raise the cover after predetermined vertical motion of said rod during the rack removal from said plating tank.

References Cited in the file of this patent

UNITED STATES PATENTS

| | | |
|---|---|---|
| 646,150 | Langton | Mar. 27, 1900 |
| 914,038 | Gugler | Mar. 2, 1909 |
| 1,490,504 | Boothman | Apr. 15, 1924 |
| 2,563,229 | Faust et al. | Aug. 7, 1951 |

FOREIGN PATENTS

| | | |
|---|---|---|
| 201,799 | Australia | June 23, 1955 |